US011347916B1

(12) United States Patent
Desai et al.

(10) Patent No.: US 11,347,916 B1
(45) Date of Patent: May 31, 2022

(54) INCREASING POSITIVE CLOCK SKEW FOR SYSTOLIC ARRAY CRITICAL PATH

(71) Applicant: Amazon Technologies, Inc., Seattle, WA (US)

(72) Inventors: Nishith Desai, Austin, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 402 days.

(21) Appl. No.: 16/457,477

(22) Filed: Jun. 28, 2019

(51) Int. Cl.
*G06F 30/327* (2020.01)
*G06N 3/10* (2006.01)
*G06F 30/396* (2020.01)
*G06F 119/18* (2020.01)

(52) U.S. Cl.
CPC .............. *G06F 30/327* (2020.01); *G06N 3/10* (2013.01); *G06F 30/396* (2020.01); *G06F 2119/18* (2020.01)

(58) Field of Classification Search
USPC .......................................................... 713/600
See application file for complete search history.

(56) References Cited

U.S. PATENT DOCUMENTS

| | | | | |
|---|---|---|---|---|
| 6,983,394 B1* | 1/2006 | Morrison | ......... | G01R 31/31708 713/500 |
| 7,187,742 B1* | 3/2007 | Logue | .................. | H03L 7/0814 375/376 |
| 7,245,684 B2* | 7/2007 | Adkisson | .................. | G06F 1/10 375/219 |
| 2011/0010564 A1* | 1/2011 | Thomas | .................... | G06F 1/10 713/189 |
| 2015/0106596 A1* | 4/2015 | Vorbach | .............. | G06F 15/7814 712/221 |

* cited by examiner

*Primary Examiner* — Mohammed Alam
(74) *Attorney, Agent, or Firm* — Robert C. Kowert; Kowert, Hood, Munyon, Rankin & Goetzel, P.C.

(57) ABSTRACT

Clock skew may be increased along a critical path of a systolic array. Pipelined registers may be added between a bus that provides input data signals to a systolic array and between a bus that receives output data signals from the systolic array. Skew circuitry for the pipelined registers may be implemented to delay a clock signal to the pipelined registries to allow a clock skew accumulated along a critical path of the systolic array to exceed a single clock cycle.

20 Claims, 11 Drawing Sheets

*Skew a clock signal to groups of pipelined registers that process data signals received from an x-direction bus to send to x-direction bus inputs at a first column of processing elements of a systolic array*
1010

*Skew the clock signal to respective second pluralities of pipelined registers that process respective data signals received from y-direction bus outputs of a last row of processing elements of the systolic array to send to a y-direction bus*
1020

FIG. 10

INCREASING POSITIVE CLOCK SKEW FOR SYSTOLIC ARRAY CRITICAL PATH

BACKGROUND

The increasing popularity of including machine learning in various different applications, such as computer vision, speech recognition, machine translation, among others, has provoked a reexamination of the ways in which underlying hardware technologies are used to apply machine learning. Systolic arrays offer a highly performant solution to execute large numbers of operations, such as multiply and accumulate, in parallel, increasing the speed of applications like machine learning that utilize such large numbers of operations. Thus, advancements in the performance of systolic arrays are highly desirable.

BRIEF DESCRIPTION OF THE DRAWINGS

FIG. 10 is a high-level flowchart illustrating various methods and techniques to implement increasing positive clock skew along a critical path of a systolic array, according to some embodiments.

Figure 1:
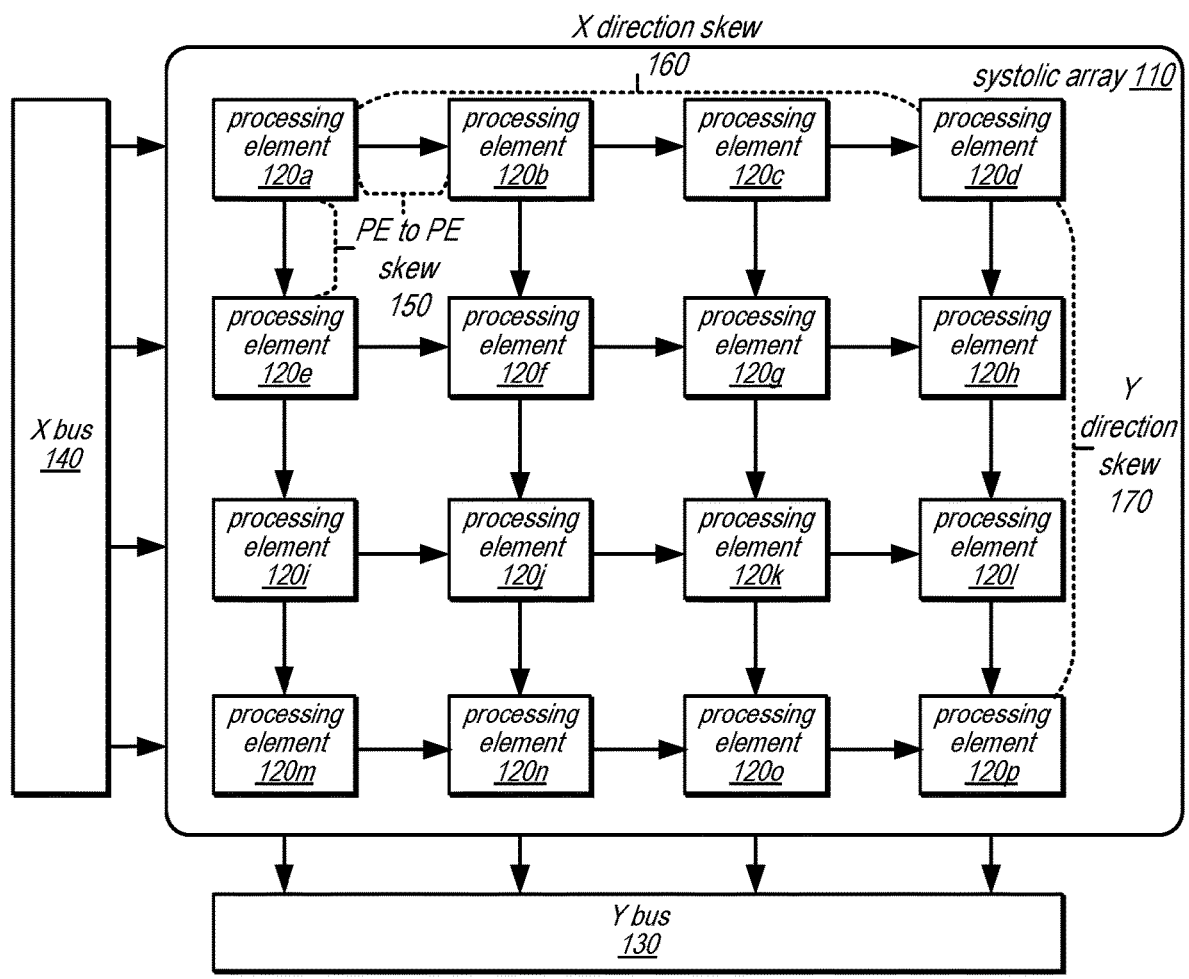
FIG. 1 illustrates a logical block diagram of different clock skews of a systolic array, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques of increasing positive clock skew along a critical path of a systolic array are described herein. In various embodiments, a systolic array may serve as a primary computation engine for various applications, such as the execution of neural networks (as discussed below with regard to FIG. 2). A systolic array may implement individual processing elements laid out in a two dimensional array, in some embodiments. The processing elements may perform a specified operation, such as "fused multiply and add," according to input data signals received from two different directions, and output a result. To handle a large number of operations a large number processing elements may be included in the systolic array (e.g., 128 columns of processing elements and 64 rows of processing elements). A clock signal may be provided to the processing elements in order to synchronize performance of the operations of the processing elements. Techniques, such as increasing positive clock skew or other useful clock skew, as well as other clock signal design techniques discussed below, may be implemented to improve various performance attributes of the systolic array, such as processing speed, low power requirements, and robust clock signaling amongst the processing elements of the systolic array, in various embodiments.

FIG. 1 illustrates a logical block diagram of different clock skews of a systolic array, according to some embodiments. Systolic array 110 may be implemented as an application specific integrated circuit (ASIC), field programmable gate array (FPGA), system-on-a-chip (SoC), or other dedicated circuitry, in various embodiments. In some embodiments, portions or all of systolic array 110 may be implemented in software, firmware, or a combination of hardware, software, and/or firmware. Systolic array 110 may include an array of processing elements, such as processing elements 120a-120p. Note that in various embodiments, the processing elements 120 of a systolic array may be arranged to form an array of various sizes, (e.g., square or various rectangular shapes), and thus the systolic array illustrated in FIG. 1 is not intended to be limiting.

In various embodiments, one or multiple input dimensions or directions to systolic array 110 may be implemented. For example, as illustrated in FIG. 1, x-direction bus 140 may provide an interconnect to input data signals to individual processing elements along the x-direction. For instance, input data signals to a column of processing elements which may be the first processing element in their respective rows may be provided (e.g., input data signals to processing element 120a, from which may be provided to other processing elements in that row, 120b, 120c and 120d, input data signals to processing element 120e, from which may be provided to processing element 120f, 120g, and 120h, and so on). Although not illustrated, input data signals in a y-direction may be provided to a first row of systolic array 110 (e.g., input data signals to processing elements 120a, 120b, 120c, and 120d). In various embodiments, the paths between processing elements 120 of systolic array 110 may be pipelined in both x and y directions.

Input signals from x-direction bus 140 may be, in some embodiments, shifted from one processing element to the next processing element in the x-direction, which may result in x-direction communications not be considered part of a critical path for systolic array 110. The operations performed by processing elements 120, such as the multiplication and accumulation of products (as noted earlier) may be output along to the next processing element in the y-direction (e.g., the output of the operation performed by processing element 120b may be input to processing element 120f, which may in turn provide as output the result of the operation performed at processing element 120f to processing element 120j, and so on). The performance of operations and providing of operation results between different rows in the y-direction may be, in at least some embodiments, considered part of the critical path for systolic array 110. In at least some embodiments, the output signals of systolic array 110 may be directed to a y-direction bus 130, which may then provide the output signals to other components for further processing (e.g., to a buffer which may then utilize some or all of the results for further processing through systolic array 110).

Timing considerations for systolic array 110 may consider various portions of systolic array 110. For example, one approach to providing optimal clock signal timing could be to consider global clock skew. However, in a systolic array where, for instance, processing elements at opposite ends of a row or column (e.g., processing elements 120e and 120h or processing elements 120d and 120p) do not directly communicate, global skew (whether balanced or not) may not offer performance benefits to systolic array 110. Processing element to adjacent processing element skew 150 may provide room for optimization as the processing elements do directly communicate (e.g., processing element 120a is abutted with or adjacent to processing element 120b and processing element 120e in the layout of systolic array 110). Techniques, as discussed below with regard to FIGS. 7A-7D, may provide different opportunities to design portions of the clock tree for individual processing elements 120 balance PE skew 150 (or obtain beneficial PE skew).

Another form of skew that could be considered is x-direction skew 160. However, as input signal values from the x-direction bus 140 may be a broadcast of values (as opposed to the operation output values in y-direction), skew (or lack thereof) may be considered as a "don't care" value for performance timing (e.g., in setup). Hold timing in the x-direction may have to be met, in some embodiments.

Y-direction skew 170 may be zero or be increased to provide a positive useful skew, in order to optimize the performance of systolic array 110 operations. For instance, FIGS. 3, 5, 6, and 10, provide examples of various features that may be implemented to increase useful skew, such as the implementation of pipelined registers with no logic between the registers with skewed clock signals to the inputs and outputs of systolic array in order to compensate and thus allow for increased useful skew (e.g., increased y-direction skew) that exceeds skew that would otherwise be limited to that of a single clock cycle.

Please note that the previous description of systolic array 110, processing elements 120, x-direction bus 140, and y-direction bus 130 are merely provided as examples of a systolic array. Different numbers of components or configuration of components may be implemented. For example, a different critical timing path may be implemented that is along (or includes) the x-direction of a systolic array, and thus various ones of the techniques discussed below may be applied to provide useful or balanced skew in the x-direction as appropriate.

This specification begins with general descriptions of an inference accelerator, which may implement systolic array with increased skew along a critical path. Various examples of different components/modules, or arrangements of components/modules that may be implemented in or along with the systolic array may then be discussed. A number of different methods and techniques to increasing skew along a critical path of a systolic array are then discussed, some of which are illustrated in accompanying flowcharts. Various examples are provided throughout the specification.

Figure 2:
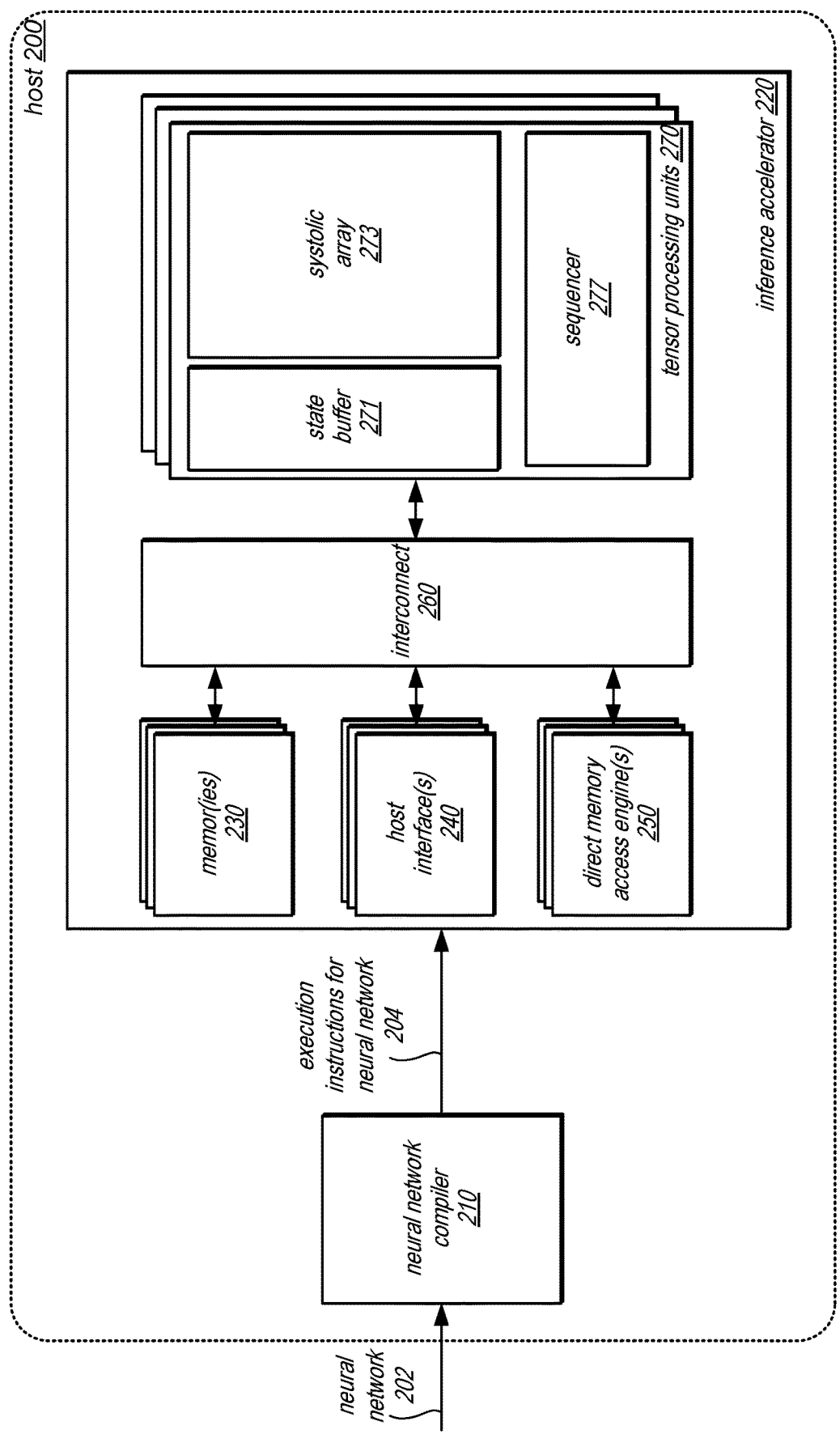
FIG. 2 is a logical block diagram illustrating a host that implements a neural network compiler that provides instructions to an inference accelerator that implements a systolic array with increased positive clock skew along the critical path, according to some embodiments.

FIG. 2 is a logical block diagram illustrating a host that implements a neural network compiler that provides instructions to an inference accelerator that implements a systolic array with increased positive clock skew along the critical path, according to some embodiments. Host 200 may be a computing system, like computing system 2000 discussed below with regard to FIG. 11 or other computing platform that may implement a neural network compiler 210 to receive a neural network 202 and generate execution instructions 204 to execute the neural network on processing units, such as tensor processing units 270 implemented as part of inference accelerator 220. Host 200 may implement an interface (not illustrated) via which neural network 202 may be received (e.g., a command or instruction that triggers an upload protocol or file transfer for the neural network). In some embodiments host 200 may be implemented as part of a network-based service that offers client applications the capability to create, train, upload and/or execute neural networks on service computing resources which may be selected based on their hardware and/or software capabilities to support different types of neural network applications (e.g., image recognition, speech recognition, sentiment recognition, etc.). In some embodiments (not illustrated) neural network compiler 210 may be implemented separately from inference accelerator (e.g., on a different host) and the execution instructions may be provided over a network connection between the two hosts to allow inference accelerator 220 to load and execute the neural network.

Inference accelerator 220 (or portions thereof, such as individual tensor processing units 270) may be implemented as an application specific integrated circuit (ASIC), field programmable gate array (FPGA), system-on-a-chip (SoC), or other dedicated circuitry. Inference accelerator 220 may implement host interface(s) 240 to receive instructions and weights to execute a neural network. For example, host interface(s) 240 may include Peripheral Component Interconnect Express (PCIe) interface that can receive the instructions 204 and load them to memor(ies) 230.

Figure 11:
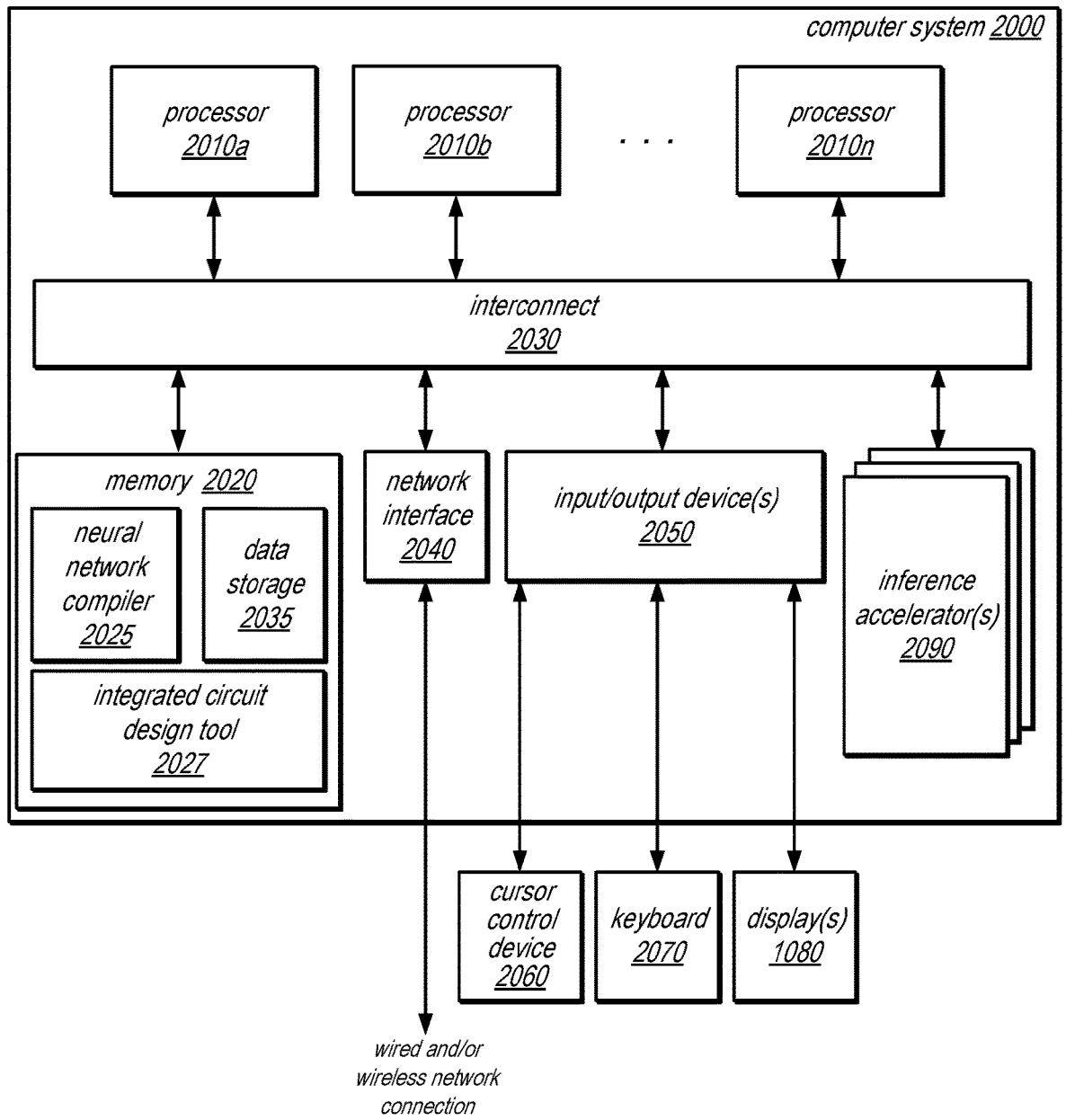
FIG. 11 is an example computer system, according to some embodiments.

In some embodiments, inference accelerator 220 may implement memor(ies) 230, such as Dynamic Random Access Memory (DRAM) (or other memory such as memory 1020 discussed below with regard to FIG. 11). Memor(ies) 230 may store instructions, weights and other data for executing a neural network (e.g., the input data for evaluation, such as input images for image recognition). In some embodiments, inference accelerator 220 may implement interconnect 260 to support communication amongst inference accelerator 220 components (e.g., host interface(s) 240, memor(ies) 230, direct memory access engine(s) 250, and tensor processing units 270. Interconnect 260 may implement one of many different kinds of bus architectures, such as an AXI fabric. In some embodiments, inference accelerator 220 may implement direct memory access (DMA) engine(s) 250. Direct memory access engine(s) 250 may support actions by tensor processing units 270 to, for instance, read, write, load, store, or otherwise access memor(ies) 230 to execute a neural network.

In some embodiments, inference accelerator 220 may implement tensor processing units 270 to perform various calculations in order to execute a neural network. Tensor processing units 270 may implement sequencer 277 which may obtain and decode the execution instructions 204 for the operations assigned to the tensor processing unit from memor(ies) 230. Sequencer 277 may use direct memory accessing engine(s) 250 to loads the weights and other information into state buffer 271 (which may be an on-chip memory, such as SRAM that acts as a dedicated cache for an individual tensor processing unit 270). In some embodiments, different tensor processing units may have different sizes of dedicated cache (and/or different sizes or shapes of a systolic array).

Tensor processing unit 270 may implement a systolic array 273 of processing elements which perform the operations of the neural network according to the weights in state buffer. Different systolic arrays may be differently shaped (e.g., longer horizontally than vertically, or vice versa, as well as square shaped), in some embodiments providing a different processing capacity. These processing elements may execute operations, such as multiply and accumulate operations and then pass input data and weights to other elements in the array 273 for further processing. After array calculations the data may be passed to other functional units (not illustrated). For instance, after the systolic array 273, the data may go through normalization and then activation, which is a non-linear sum of the partial products (e.g. tan h or reLU). Data, such as input feature maps, filters, and output features may be processed through systolic array 273. Results may loop back through state buffer 271 for additional processing or pass through additional calculations at the output of the systolic array 273.

Figure 3:
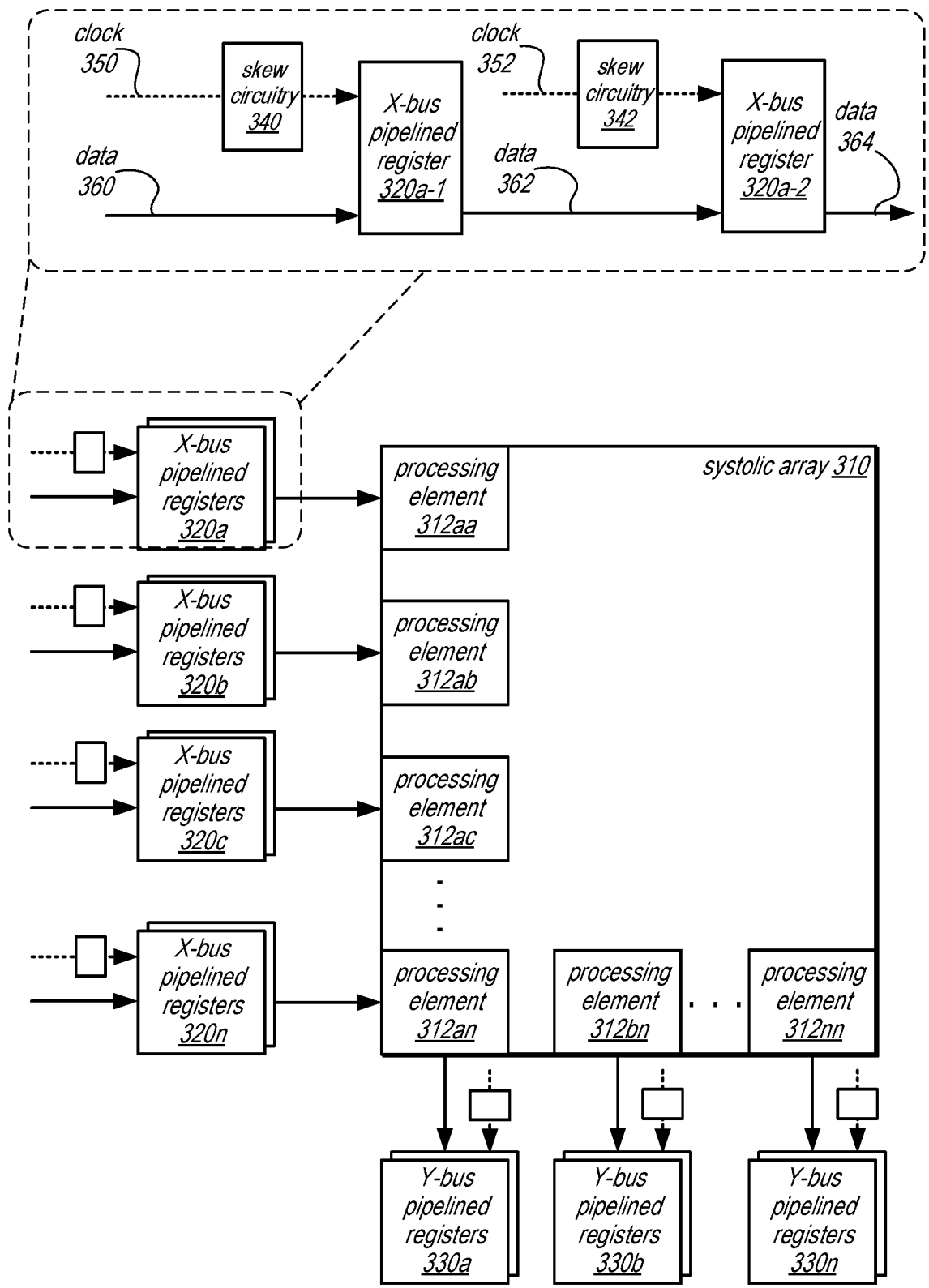
FIG. 3 is a logical block diagram illustrating pipelined registers for input data signals and output data signals of a systolic array that feature skew circuitry to allow for increased positive clock skew along the critical path, according to some embodiments.

Systolic arrays, such as systolic arrays 273 implemented as part of tensor processing units 270 of inference accelerator 220 may implement various timing features discussed above with regard to FIG. 1 in order provide useful skew for performing operations along a critical path in the systolic array. For instance, multiple pipelined stages, such as registers, may be added to input signals and output signals from the systolic array. Clock signals to the additional stages may be skewed to align the output values of the systolic array with other clock trees providing timing for recipient logic at other components (e.g., other components of tensor processing unit 270 in FIG. 3). FIG. 3 is a logical block diagram illustrating pipelined registers for input data signals and output data signals of a systolic array that feature skew circuitry to allow for increased positive clock skew along the critical path, according to some embodiments.

Systolic array 310 (e.g., like systolic array 110 in FIG. 1 or systolic array 273 in FIG. 2) may include multiple processing elements 312 laid out in an array. For ease of illustration, only a portion of processing elements 312, such as processing elements 312aa, 312ab, 312ac, 312an, 312bn, and 312nn are illustrated. The input signals (or at least some of the input signals) for systolic array 310 may be obtained from an x-direction bus (not illustrated) and may include various data as discussed above with regard to FIG. 2 (e.g., input data to be evaluated, such as image data). The input data signals for a processing element 312 may be provided to a corresponding group of pipelined registers (e.g., 2 or more pipelined registers), such as x-bus pipelined registers 320a corresponding to processing element 312aa, x-bus pipelined registers 320b corresponding to processing element 312ab, x-bus pipelined registers 320c corresponding to processing element 312ac, and x-bus pipelined registers 320n corresponding to processing element 312an. Pipelined registers 320 and 330 may have no logic between the pipeline registers (e.g., no logic between x-bus pipelined register 320a-1 and 320a-2), in various embodiments. In this way, the skew of the clock signal to the pipelined registers may implement a designed skew to compensate for accumulated useful skew in systolic array 310 so that the portions of the clock tree that input data to and receive data from the systolic array 310 (e.g., x-bus, y-bus, etc.) are still synchronized with the systolic array 310.

To allow for useful skew to be implemented along a critical path for systolic array 310, the multiple x-bus pipelined registers may be timed to add time to the clock signal so that additional time may be given to processing elements 312*aa*, 312*ab*, 312*ac*, to 312*an* (and the like in other columns of systolic array not illustrated) to complete operations. For instance, as depicted in FIG. 3, an input data signal 360 may be received at x-bus pipelined register 320*a*-1. Clock signal 350 may also be received and skewed according to skew circuitry 340 (e.g., using buffers, inverters, or various other positive or negative skew inducing components). After the skew of the clock signal 350, x-bus pipelined register 320*a*-1 may output the data signal to x-bus pipelined register 320*a*-2, which may again add time to the critical path as data 364 may not be output until clock signal 352 is received having passed through skew circuitry 342. Respective skew circuitry may be implemented for each respective set or group of x-bus pipelined registers 320. In various embodiments the delay provided by skew circuitry may not be the same across different groups of x-bus pipelined registers (or between registers of the same group). For instance the skew applied to clock 350 to register 320*a*-1 may be different than the skew applied to clock 352 to register 320*a*-2, and/or the skew applied to the clock signals of registers 330*a* may be different than the skew applied to registers 330*b*. As noted above, positive or negative skew may be applied (e.g., by delay a clock signal to registers or causing the clock signal to arrive earlier at a register than another register, such as by including less buffers or inverters on that clock path than for the other register), in some embodiments.

Similar techniques may be implemented for y-bus pipelined registers 330*a*, 330*b*, and 330*n*. For example, the output data signal (e.g., received from processing elements 312*an*, 312*bn* and 312*nn* respectively) may be sent to a first y-bus pipelined register 330, which may hold the output data until a clock signal having passed through skew circuitry for the y-bus pipelined register is received. Such pipelined registers may be repeated to again increase the skew allowed in the critical path of systolic array 310.

In addition to features, such as pipelined registers, external to a systolic array, internal layouts and/or components providing a clock signal within a systolic array may increase useful skew as well as minimizing or preventing other timing problems. For instance, a main trunk for the clock signal may be implemented within a systolic array in order to provide clock signal connections to the different processing elements of the timing array. Various considerations for placement of the main trunk within a systolic array can arise. For instance, some placements of a main trunk may have longer branch paths as a result of earlier points of divergence from the main trunk, which could produce greater variations in clock signal arrival times at processing elements or disparately impact systolic array performance or power needs. A center main trunk, however, can provide for a later point of divergence, reducing clock signal variation and performance or power impacts.

Figure 4:
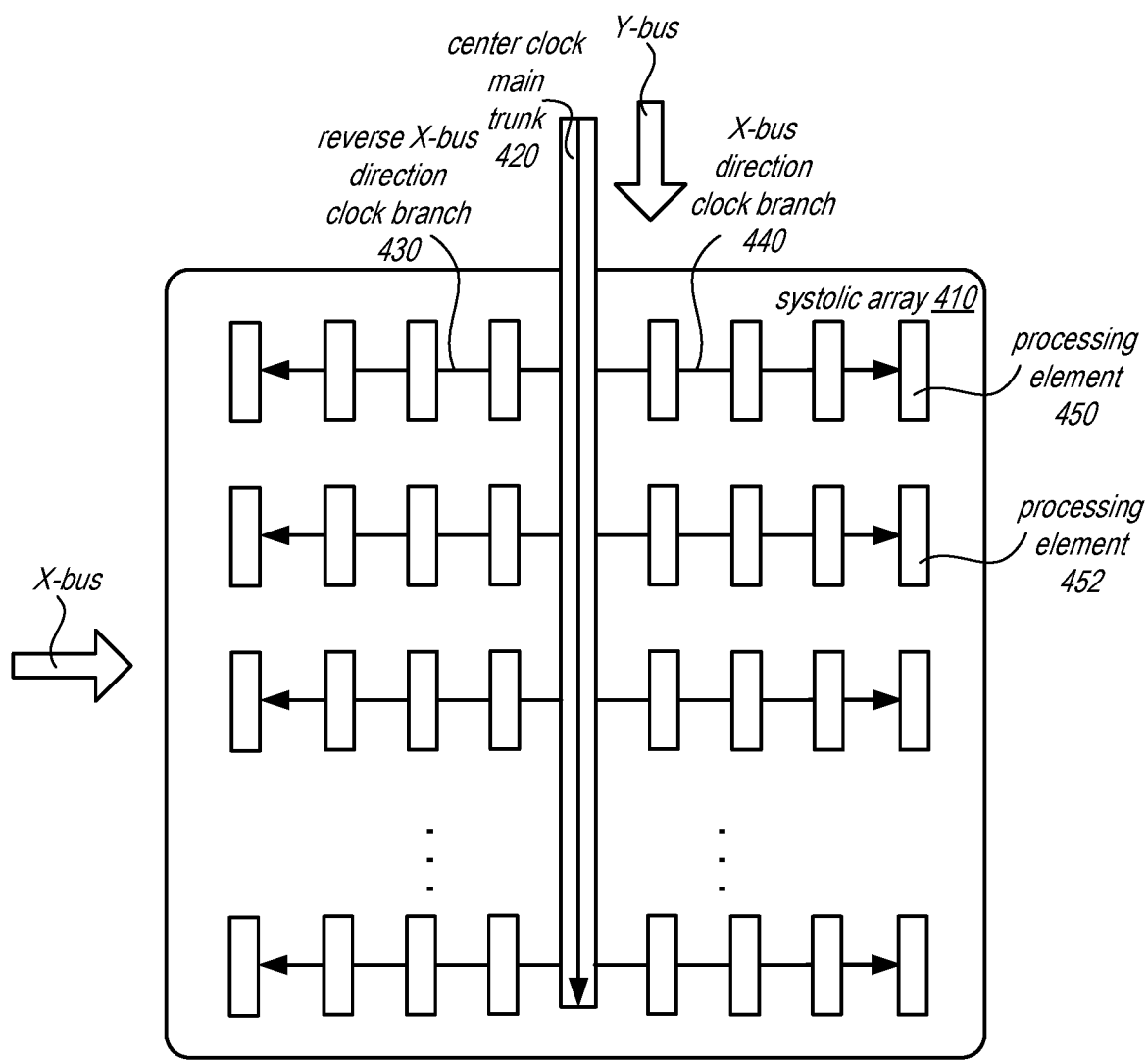
FIG. 4 is a logical block diagram illustrating a center main trunk for providing a clock signal to a systolic array, according to some embodiments.

FIG. 4 is a logical block diagram illustrating center main trunk for providing a clock signal to a systolic array, according to some embodiments. Systolic array 410 (e.g., similar to systolic arrays 110 and 273 discussed above) may implement various processing elements, including processing elements 450 and 452. Center clock main trunk 420 may be implemented for systolic array 410 to provide clock signal to processing elements within systolic array. Different halves of systolic array 410 may receive clock signal in different branch directions. For example, a reverse x-bus direction clock branch 430 may be implemented to provide clock signal to some processing elements, while x-bus direction clock branch 440 may be implemented to provide clock signal to other processing elements. A center clock main trunk 420 may reduce on-chip variation (OCV) (when compared with one sided main trunk implementations) and relocate the point of divergence of the clock signal to processing elements further down the clock tree of systolic array 410. In this way the variation in clock signal between, for instance, processing elements 450 and 452 may be reduced to half of that provided if an x-bus side main trunk for clock signal were implemented, in some embodiments.

Figure 5:
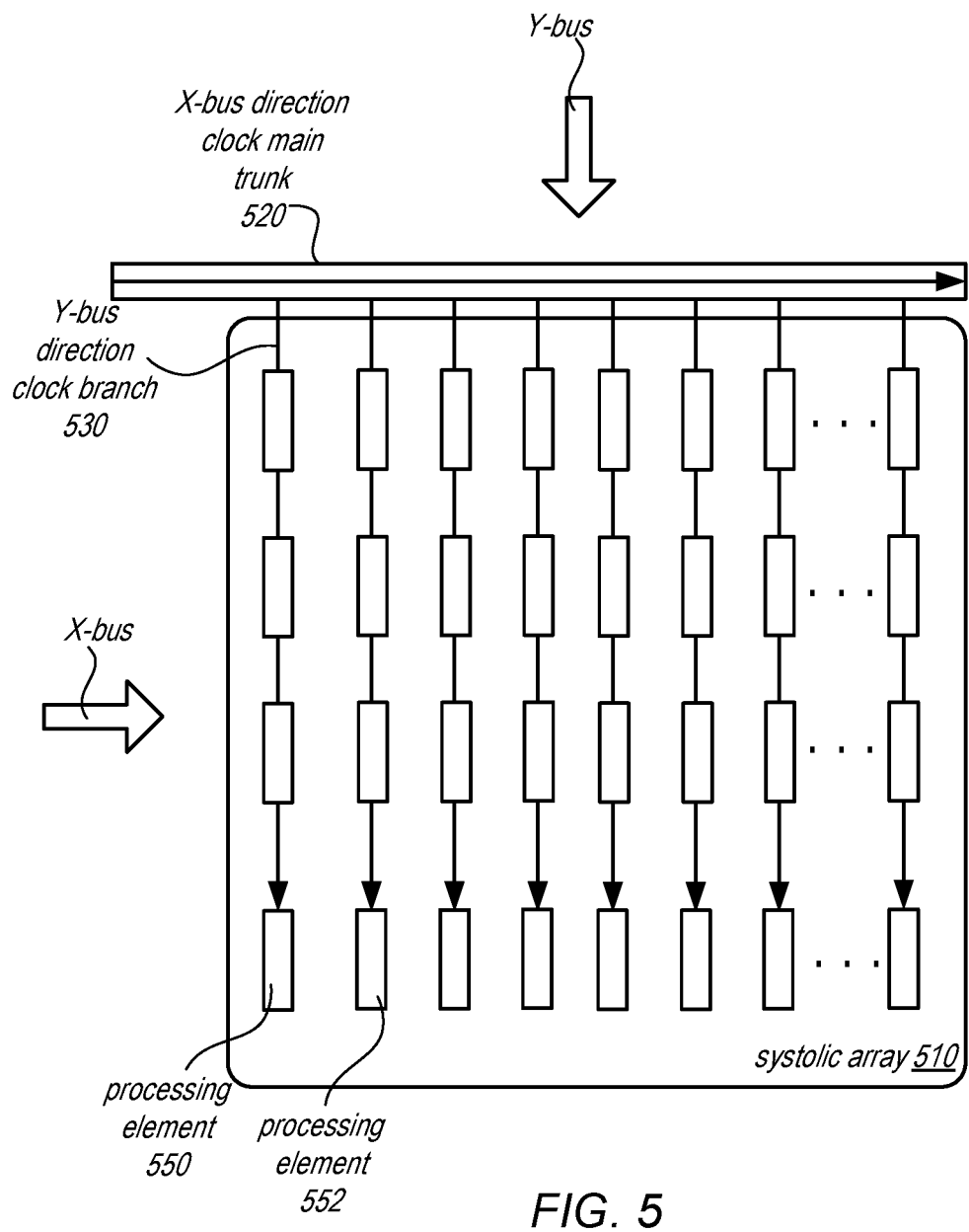
FIG. 5 is a logical block diagram illustrating an X-bus direction main trunk for providing a clock signal to a systolic array, according to some embodiments.

Other arrangements for providing clock signal may accommodate critical path timing in a y-bus direction. A horizontal (e.g., x-bus direction) main trunk for instance could provide branches for clock signal that serve processing elements in a column of a systolic array (as opposed to a row as illustrated in FIG. 4). FIG. 5 is a logical block diagram illustrating an X-bus direction main trunk for providing a clock signal to a systolic array, according to some embodiments.

Systolic array 510 (e.g., similar to systolic arrays 110 in FIGS. 1 and 273 in FIG. 2) may implement an x-bus direction clock main trunk 520. Y-bus direction clock branches, such as y-bus direction clock branch 530 may provide clock signal to processing elements in a column of systolic array 510. Utilizing this lay for clock signal (or the layout illustrated in FIG. 6) may shift the worst OCV between processing elements between columns (e.g., processing element 550 and 552), which may not impact performance since (as discussed above with regard to FIG. 1), x-direction timing may not be part of a critical path for systolic array 510.

Figure 6:
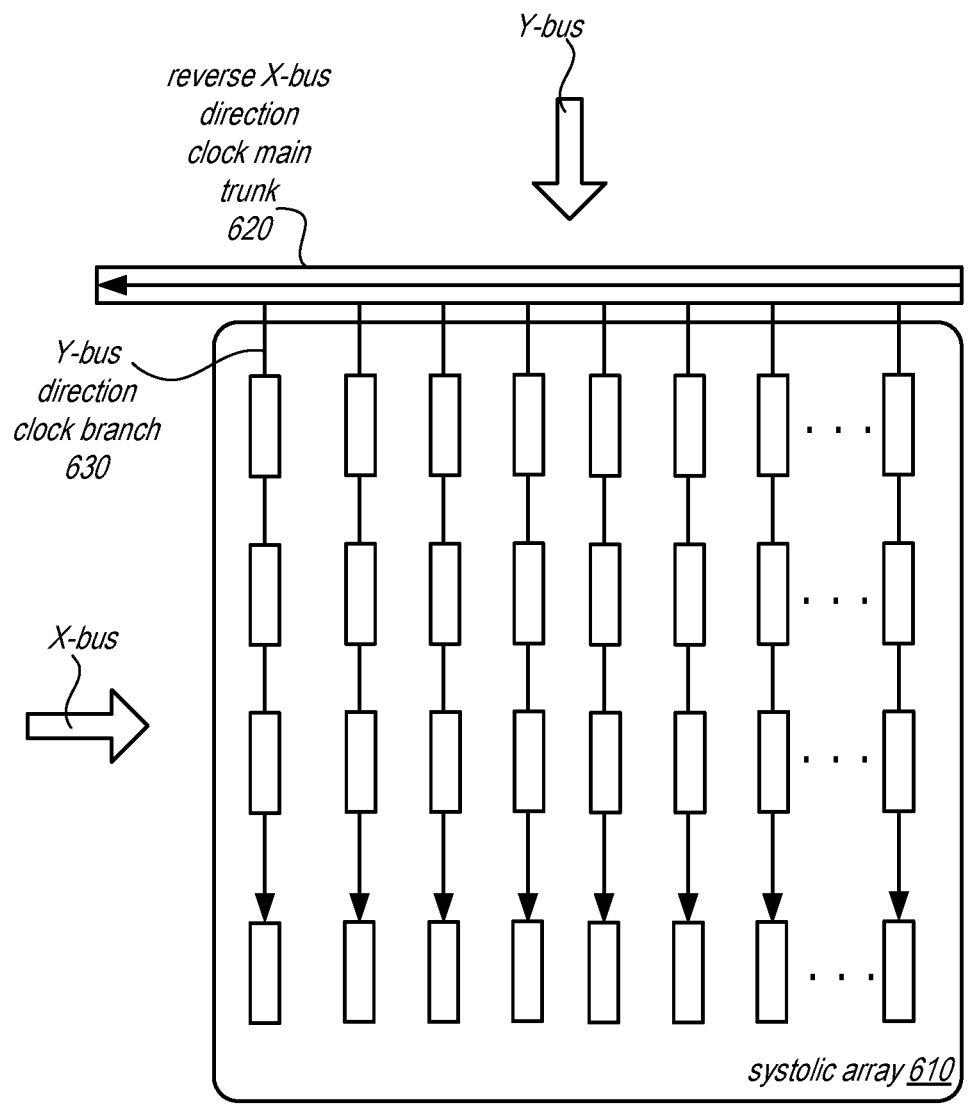
FIG. 6 is a logical block diagram illustrating a reverse X-bus direction main trunk for providing a clock signal to a systolic array, according to some embodiments.

FIG. 6 offers a similar layout to that of FIG. 5. However, in FIG. 6, systolic array 610 (e.g., similar to systolic array 110 in FIGS. 1 and 273 in FIG. 2) may implement reverse x-bus direction clock main trunk 620, from which y-bus direction clock branches, such as y-bus direction clock branch 630, provide clock signal to processing elements in columns of systolic array 610. By routing the main trunk in reverse direction, to the oppose of the x-direction bus, hold timing problems between processing elements along rows of the systolic array 610 may be mitigated, in some embodiments. a Some clock timing optimizations may be implemented for a systolic array by strategically deploying optimization techniques to portions of a clock tree for a systolic array (e.g., a hierarchical approach to clock tree planning). FIGS. 7A-7D are logical block diagrams illustrating the application of clock tree synthesis to specified portions of a systolic array by an integrated circuit design tool, according to some embodiments.

Figure 7A:
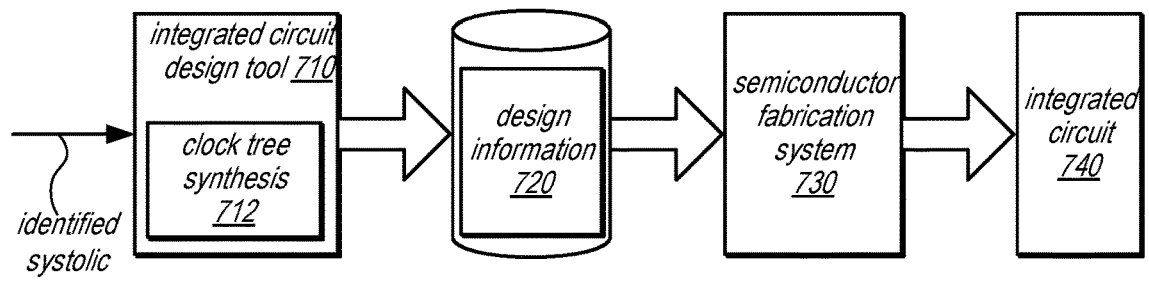
FIGS. 7A-7D are logical block diagrams illustrating the application of clock tree synthesis to specified portions of a systolic array by an integrated circuit design tool, according to some embodiments.

In FIG. 7A, integrated circuit design tool may be implemented as part of a technique for designing and producing circuitry for a systolic array, which may include a systolic array that implements any of the various features discussed above with regard to FIGS. 1-6 or below with regard to FIGS. 8-10 (in addition to those in FIGS. 7B-7D). Integrated circuit design tool 710 may be implemented on a host computing system (e.g., computing system 2000 in FIG. 11) and generate, create, update, and/or store design information which may then be accepted by semiconductor fabrication system 730 to produce an integrated circuit 740 according to the design information 720. Integrated circuit design tool 710 may implement various features, such as features to perform design specification, behavioral description, register transfer level description, floor planning, automated route placement, various verification and testing features, among other features.

In at least some embodiments, integrated circuit design tool 710 may implement clock tree synthesis 712. Clock tree synthesis 712 may automatically test and apply various structures and components in a clock tree (e.g., a route for clock signal) among components of an integrated circuit. For example, clock tree synthesis 712 can identify various placements for buffers or inverters to meet area and power constraints, balancing or minimize clock skew and latency, and perform various other configurations (e.g., utilize different clock tree structures) when determining a clock tree for an integrated circuit. As discussed below with regard to FIGS. 7B-7D, as part of utilizing integrated circuit design tool 710, a portion of a systolic array 714 may be identified for clock tree synthesis. However, other features or discussed techniques may be implemented by integrated circuit design tool 710 (e.g., the placement of inverters or buffers as discussed below with regard to FIGS. 8 and 9).

Design information 720 may be specified using any of various appropriate computer languages, including hardware description languages such as VHDL, Verilog, SystemC, SystemVerilog, RHDL, M, MyHDL, among others. Semiconductor fabrication system 730 may be able to parse, interpret, or otherwise determine how to implement integrated circuit 740 based on design information. For example, design information 720 may use or reference one or more cell libraries which may specify the synthesis and/or layout of integrated circuit 740.

Semiconductor fabrication system 730 may implement various techniques or processes to produce integrated circuit 740 according to design information 720. For example, semiconductor fabrication system 730 may implement one or more series of processes, fabrication stages, assembly lines or other manufacturing stations to deposit various semiconductor materials (e.g., on a silicon wafer according to masking techniques), remove materials, alter or modify the shape of deposited materials. Semiconductor fabrication system 730 may also perform various testing operations or procedures on fabricated circuits to verify correct operation of the fabricated circuits.

Figure 7B:
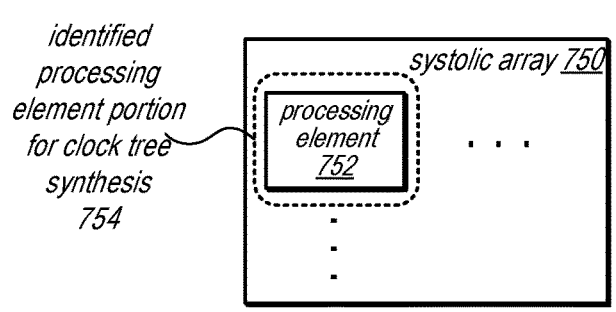
Figure 7C:
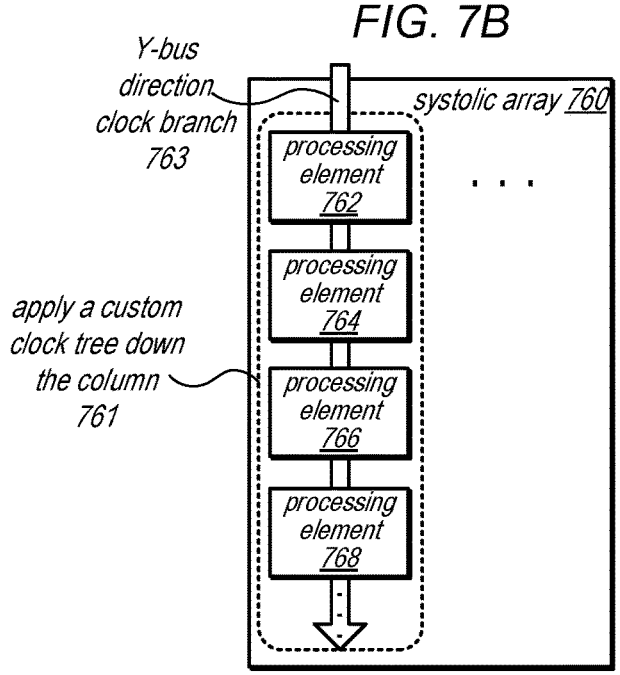

In FIG. 7B, an individual processing element 752 of systolic array 750 may be identified as an individual portion 754 for clock tree synthesis by integrated circuit design tool 710. For example, because processing elements may be adjacent (or nearly adjacent), as discussed above with regard to FIG. 1, clock tree synthesis may be applied to minimize skew between adjacent processing elements (e.g., as clock signal timing within a processing element may be balanced according to the techniques of clock tree synthesis). In some embodiments, a timing model library (e.g., extracted timing model (ETM)) may be used for top level clocking to achieve a regular clock tree that includes the processing element.

In addition to (or instead of) implementing a design hierarchy for individual processing elements, integrated circuit design tool may be used to identify and plan for a group of processing elements. For example, in FIG. 7C, systolic array 760 may implement processing elements 762, 765, 766, and 768 in a column that receive a clock signal from y-bus direction clock branch 763. While an individual processing element of the column may be designed using clock tree synthesis to minimize skew within the processing element, the column may be identified 761 for custom clock tree down the column. In this way, useful skew for the column can be designed, or if not useful, minimized, in some embodiments. In this way a common timing model may be applied down the column, and repeated for each additional column added to the systolic array, in some embodiments. A custom clock tree may then be applied to the design to connect the different columns to the main trunk clock signal (e.g., X-bus direction main trunk).

Figure 7D:
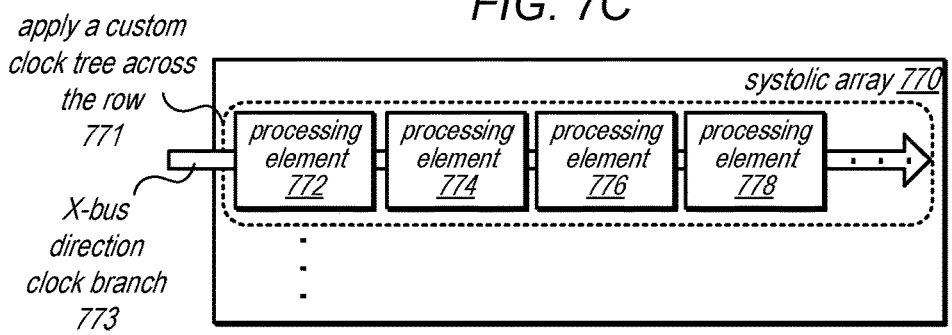

In FIG. 7D, systolic array 770 may implement a row of processing elements, 772, 774*l* 776, 778, which may receive clock signal via x-bus direction clock branch 773. The row may be identified 771 for a custom clock tree, to minimize skew within the row, in some embodiments. Designing the systolic array on a row by row or column by column basis as illustrated in FIGS. 7C and 7D may provide a more deterministic and structured clock plan, that can be easily replicated to provide a divide and conquer clock tree building strategy, saving tool runtimes. In some embodiments, scan decompression and compression logic can be added to the hierarchy of processing elements, saving tool runtime and reducing complexity.

Figure 8A:
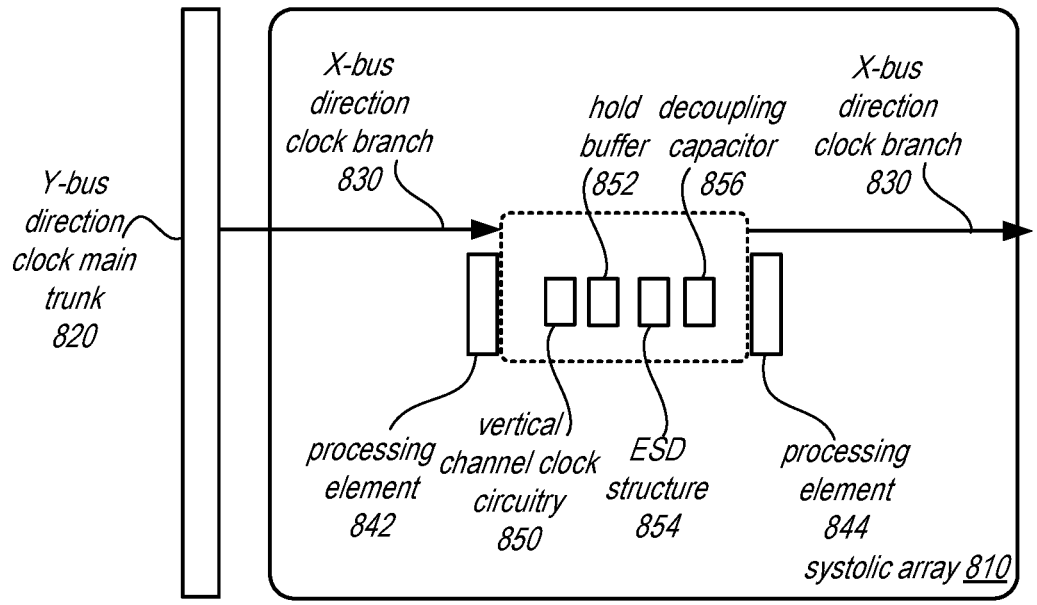
FIGS. 8A-8B are logical block diagrams illustrating different vertical channels for providing a clock signal to processing elements of a systolic array, according to some embodiments.
Figure 8B:
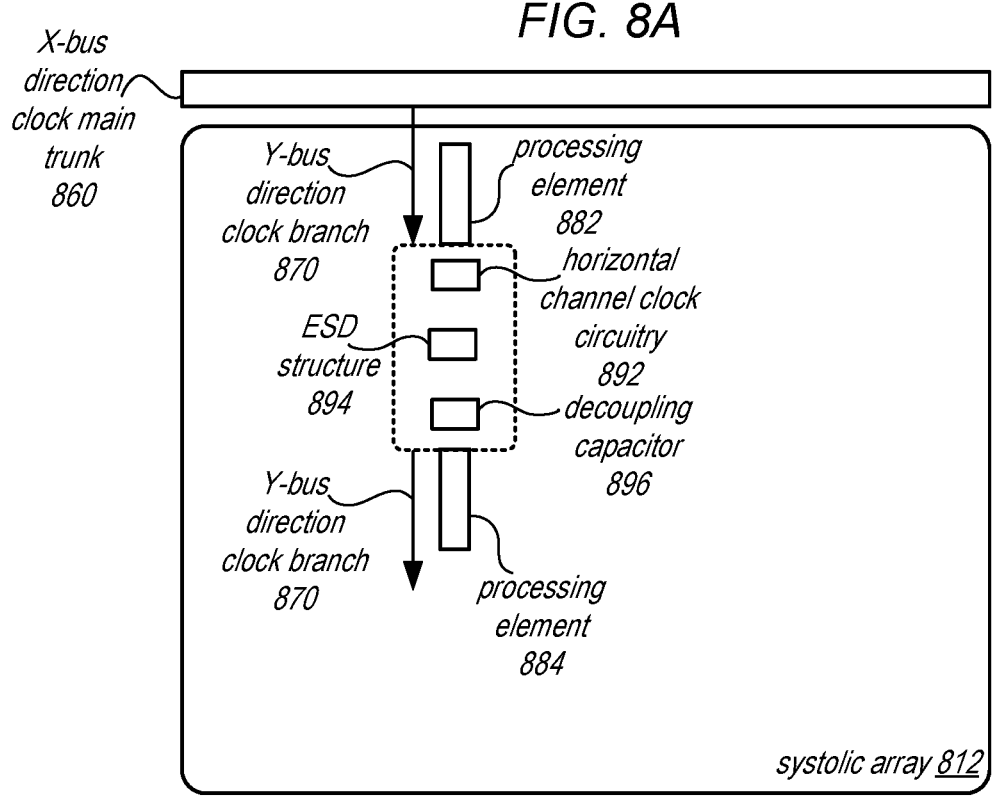

Other clock timing optimization for a systolic array can involve utilization of different layers or channels for implement clock tree components. FIGS. 8A and 8B are logical block diagrams illustrating different vertical and horizontal channels for providing a clock signal to processing elements of a systolic array, according to some embodiments. In FIG. 8A, systolic array 810, a y-bus direction main trunk 820 may provide an x-bus direction clock branch 830 in order to provide clock signal to processing elements 842 and 844. As the layout, size, or other features of systolic array 810 may implicate various design considerations and features to meet performance specifications, additional circuitry may be included as part of implementing the clock signal path.

For example, repeaters may be implemented to route clock signals (as well as feedthrough signals) amongst processing elements. Similarly, other signals (e.g., weight-load signals broadcast in x-direction) may make use of pipelining flops after traversing a certain distance in order to meet a required cycle time. A vertical channel, such as Vertical channel clock circuitry 850 (and other vertical circuitry for non-clock components, such as an electrostatic sensitivity device (ESD) structure 854, like an ESD clamp, hold buffer 852, and decoupling capacitor 856) may be implement such features. For example, an ESD clamp cell may have to be repeatedly placed according to a specified distance (e.g., 1500 µm) and may utilize a vertical channel. A clock buffer can be implemented as part of vertical channel clock circuitry 850 to take advantage of the vertical channel used for the ESD clamp cell. A vertical channel can also be used for bypass decoupling capacitors 856 that are used to mitigate local IR drop hotspots in a power grid.

In FIG. 8B, another example of utilizing a horizontal channel is illustrated. Systolic array 812 and an x-bus direction main trunk 860 may provide a y-bus direction clock branch 870 in order to provide clock signal to processing elements 882 and 884. Although hold concerns may not existing along a y-direction clock branch 870, other components may be included in a horizontal channel to account for the various design concerns and features discussed above, such as horizontal channel clock circuitry 892, ESD structure 894, and decoupling capacitor 896. In some embodiments, the main trunks illustrated in FIGS. 8A and 8B may be routed and/or buffered in the respective horizontal or vertical channels.

Figure 9A:
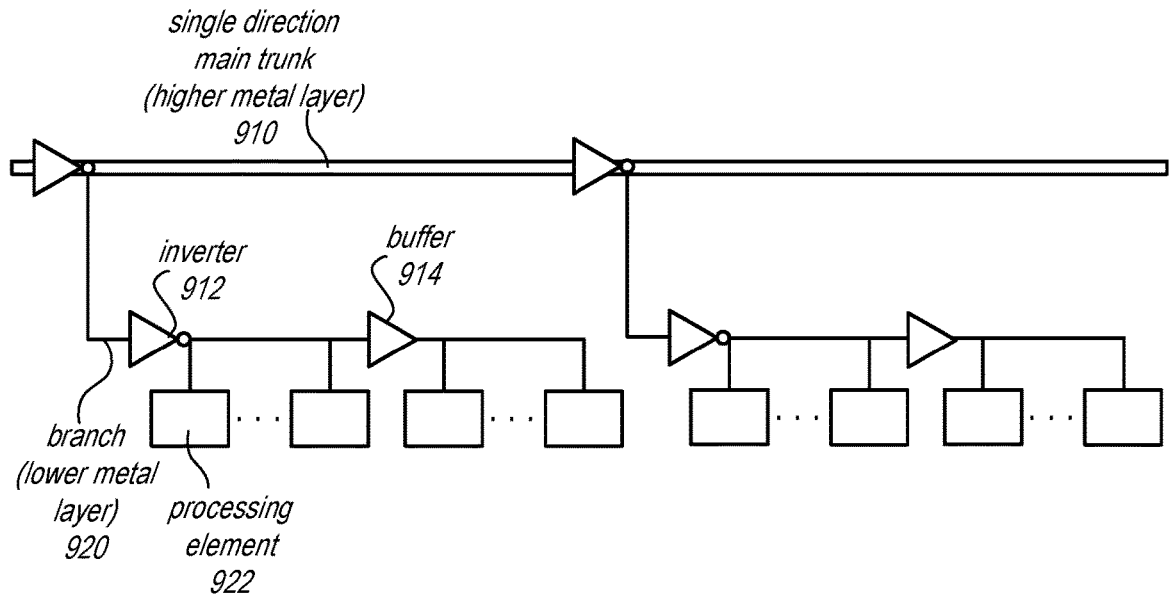
FIGS. 9A-9B are logical block diagrams illustrating different metal layers for providing a clock signal to processing elements of a systolic array, according to some embodiments.
Figure 9B:
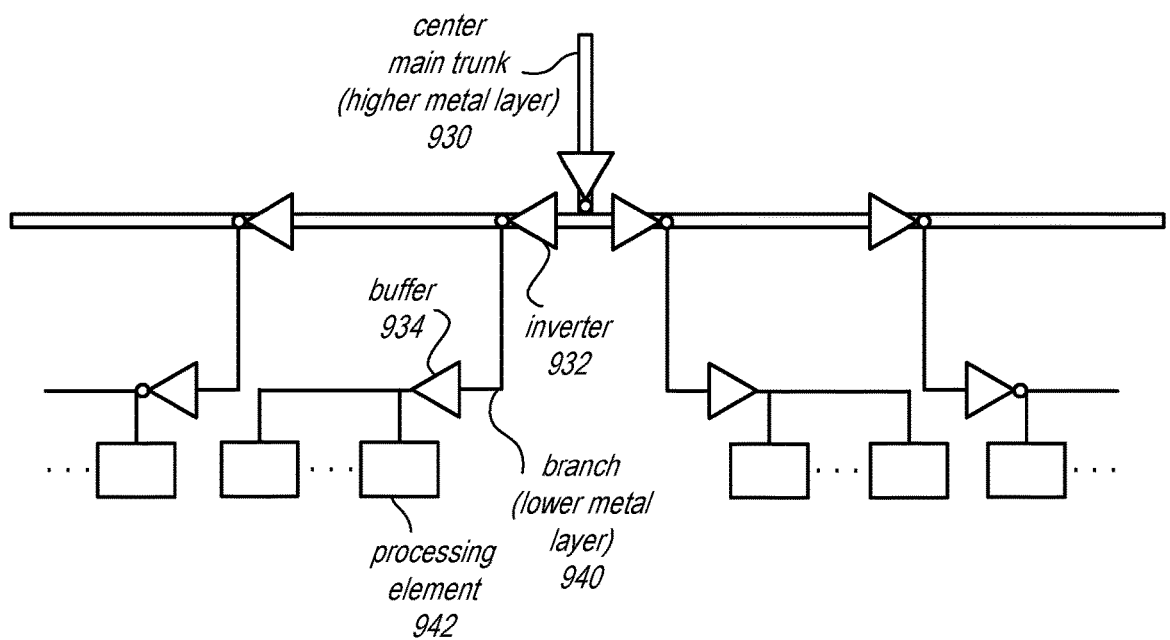

In some instances, regular or standard drive strength clock cells may be implemented as part of a clock tree for clock networks in a systolic array. To provide high drive strength for clock signal, utilization of different metal layers within a systolic array may be implemented, in some embodiments. FIGS. 9A-9B are logical block diagrams illustrating different metal layers for providing a clock signal to processing elements of a systolic array, according to some embodiments.

In FIG. 9A, a single direction main trunk 910 (e.g., a y-direction main trunk or x-direction main trunk as discussed above with regard to FIGS. 5 and 6) may be implemented for a systolic array higher metal layer (when compared with branch 920). Single direction main trunk 910 may provide clock signal via branches, such as branch 920, to processing elements, such as processing element 922. As indicated at 920, the branch may be implemented on a lower metal layer. Regular drive strength cells (not illustrated) may be implemented to minimize local skew and insertion delay on branch paths. In some embodiments, inverters, such as inverter 912 may be implemented along a branch path and/or buffers, such as buffer 914. Where possible, inverters may be inserted instead of buffers, which may also minimize local skew and insertion delay on branch paths.

FIG. 9B illustrates an example of different metal layers for a center main trunk. Center main trunk 930 may provide clock signal to processing elements, such as processing elements 942. Various inverters, such as inverter 932, and buffers, such as buffer 934, may be implemented for different branches, such as branch 940, which may be implemented at a lower metal layer than center main trunk 930. As noted above use of regular drive strength cells (not illustrated) as well as judicious utilization of inverters instead of buffers may minimize local skew and insertion delay on branch paths in such a layout.

The examples of a systolic array have been given in regard to an example inference device. Note that various other types or configurations of systolic arrays may implement the above techniques. In addition to examples given above, the techniques discussed below with regard to FIG. 10 may be also implemented using the various components discussed above as well as different types of systems or devices that implement a systolic array.

As discussed above with regard to FIG. 1, a systolic array may utilize different direction buses to receive input data signals and output data signals. In addition to these buses, pipelined stages, such as pipelined registers, may be implemented between the buses and the respective processing elements of the systolic array (e.g., a series of two or more pipelined registers between an x-direction bus that provides an input data signal to a processing element in a first column of systolic array and a series of two or more pipelined registers between a y-direction bus that receives an output data signal from a processing element in a last row of a systolic array.

As indicated at 1010, a clock signal to groups of pipelined registers that process data signals received from an x-direction bus to send to x-direction bus inputs at a first column of processing elements of a systolic array may be skewed. For example, various components, such as buffers, inverters, other components (or combinations thereof) may be implemented to modify or otherwise skew a clock signal provided to a pipelined register. As noted above, this skew may be particular to an individual pipelined register for one processing element in the column or may be similar to the skew provided to multiple pipelined registers for multiple processing elements in the column. In some embodiments, some pipeline registers may not be skewed (e.g., one pipelined register for one processing element in the column may not receive a skewed clock signal).

As indicated at 1020, a clock signal to groups of pipelined registers that process data signals received from y-direction bus outputs of a last row of the systolic array to send to a y-direction bus may be skewed. For example, various components, such as buffers, inverters, other components (or combinations thereof) may be implemented to modify or otherwise skew a clock signal provided to a pipelined register (as noted above at 1010). As also noted above, this skew may be particular to an individual pipelined register for one processing element in the column or may be similar to the skew provided to multiple pipelined registers for multiple processing elements in the row (and/or in the column delayed above at 1010). In some embodiments, some pipeline registers may not be skewed (e.g., one pipelined register for one processing element in the row may not receive a skewed clock signal).

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Embodiments of a host system which may include or interact with an inference device implementing a systolic array as discussed above may be implemented as part of a computer system. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 may include one or more inference accelerators 2090 or other systolic arrays (e.g., similar to processing units and inference accelerators discussed above with regard to FIGS. 1-10). These inference accelerators 2090 or other systolic arrays may perform operations for various applications, which may include executing neural networks according to instructions generated by neural network compiler 2025 (or another compiler not illustrated), in some embodiments. As discussed above with regard to FIG. 7A, in some embodiments, an integrated circuit design tool 2027 may be implemented to generate and store design information (e.g., in a non-transitory computer-readable storage medium, like a block-based storage device) which can be provided to a semiconductor fabrication system.

Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions, such as program instructions to implement neural network compiler 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   skewing a clock signal to a first group of pipelined registers that process respective data signals received from an x-direction bus to send to x-direction bus inputs at a first column of processing elements of a systolic array;
   skewing the clock signal to a second group of pipelined registers that process respective data signals received from y-direction bus outputs of a last row of processing elements of the systolic array to send to a y-direction bus;
   wherein the skewing of the clock signal to the first group of pipelined registers and the skewing of the clock signal to the second group of pipeline registers allows a useful clock signal skew accumulated along a critical path of the systolic array to exceed a single clock cycle.

2. The method of claim 1, further comprising providing the clock signal to the systolic array via a center main trunk in a y-bus direction that routes the clock signal to a first half of a row of processing elements of the systolic array via an x-bus direction branch and to a second half of the row of processing elements of the systolic array via a reverse x-bus direction branch.

3. The method of claim 1, further comprising providing the clock signal to the systolic array via a single main trunk in an x-bus direction that routes the clock signal to a column of processing elements of the systolic array via a y-bus direction branch.

4. The method of claim 3, wherein the y-bus direction branch is implemented on a lower metal layer than a metal layer of the single main trunk.

5. The method of claim 1, wherein the systolic array is implemented as part of a tensor processing unit of an inference accelerator of a host system, and wherein the method further comprises:
   receiving a neural network to be executed at the host system;
   compiling the neural network for execution by the inference accelerator of the host system; and
   executing, by the inference accelerator, the compiled neural network.

6. An apparatus, comprising:
   a systolic array comprising a plurality of processing elements;
   skew circuitry that provides a clock signal to a first group of pipelined registers that process input data signals received from a first direction bus that provides the input data signals to send to those processing elements of the systolic array that receive the input data signals from the first direction bus;
   skew circuitry that provides the clock signal to a second group of pipelined registers that process output data signals received from those processing elements of the systolic array that provide the output data signals to a second direction bus to send to the second direction bus; and
   wherein the skew circuitry for the first group of pipeline registers and the skew circuitry for the second group of pipeline registers corrects for accumulated clock signal skew of the systolic array that exceeds a single clock cycle.

7. The apparatus of claim 6, wherein the systolic array further comprises a center main trunk to provide the clock signal to the plurality of processing elements of the systolic array in the second direction that routes the clock signal to a first half of processing elements of the systolic array via one or more first direction branches and to a second half of the row of processing elements of the systolic array via one or more reverse first direction branches.

8. The apparatus of claim 7, wherein the one or more first direction branches and the one or more reverse first direction branches are implemented on a lower metal layer than a metal layer implementing the center main trunk.

9. The apparatus of claim 6, wherein the systolic array further comprises a single main trunk in the first direction to provide the clock signal to the plurality of processing elements of the systolic array that routes the clock signal to different groups of processing elements of the systolic array via respective second direction branches.

10. The apparatus of claim 6, wherein the systolic array further comprises a single main trunk in reverse of the first direction to provide the clock signal to the plurality of processing elements of the systolic array that routes the clock signal to different groups of processing elements of the systolic array via respective second direction branches.

11. The apparatus of claim 6, wherein a buffer for the clock signal is located in a vertical channel between a first processing element and a second processing element of the systolic array.

12. The apparatus of claim 6, wherein the systolic array comprises a single main trunk to provide the clock signal to the plurality of processing elements, and wherein a branch from the single main trunk that provides the clock signal to a portion of the processing elements is implemented on a lower metal layer than a metal layer implementing the single main trunk.

13. The method of claim 12, wherein the branch from the single main trunk includes one or more inverters.

14. A system comprising:
a non-transitory, computer-readable storage media, storing design information that specifies a design of at least a portion of an integrated circuit in a format recognized by a semiconductor fabrication system that is configured to use the design information to produce the circuit according to the design, the design including:
a systolic array comprising a plurality of processing elements;
skew circuitry for a clock signal to first group of pipelined registers that process input data signals received from a first direction bus that provides the input data signals to send to those processing elements of the systolic array that receive the input data signals from the first direction bus;
skew circuitry for the clock signal to a second group of pipelined registers that process output data signals received from those processing elements of the systolic array that provide the output data signals to a second direction bus to send to the second direction bus; and
wherein the skew circuitry for the first group of pipeline registers and the skew circuitry for the second group of pipeline registers corrects for accumulated clock signal skew of the systolic array that exceeds a single clock cycle.

15. The system of claim 14, wherein the systolic array further comprises a center main trunk to provide the clock signal to the plurality of processing elements of the systolic array in the second direction that routes the clock signal to a first half of processing elements of the systolic array via one or more first direction branches and to a second half of the row of processing elements of the systolic array via one or more reverse first-direction branches.

16. The system of claim 15, wherein the one or more first-direction branches and the one or more reverse first direction branches are implemented on a lower metal layer than a metal layer implementing the center main trunk.

17. The system of claim 14, wherein the systolic array further comprises a single main trunk in the first direction to provide the clock signal to the plurality of processing elements of the systolic array that routes the clock signal to different groups of processing elements of the systolic array via respective second direction branches.

18. The system of claim 14, wherein the systolic array further comprises a single main trunk in reverse of the first direction to provide the clock signal to the plurality of processing elements of the systolic array that routes the clock signal to different groups of processing elements of the systolic array via respective second-direction branches.

19. A system, comprising:
a processor; and
a memory, storing program instructions that when executed by the processor cause the processor to implement an integrated circuit design tool to create a design of at least a portion of an integrated circuit in a format recognized by a semiconductor fabrication system that is configured to use the design information to produce the circuit according to the design;
the integrated circuit design tool, configured to:
receive a request to apply clock tree synthesis individually to a processing element of a systolic array in the design;
apply clock tree synthesis to determine an internal clock tree for the processing element; and
update the design to include the determined internal clock tree for the processing element;
wherein the design includes:
skew circuitry for a clock signal to first group of pipelined registers that process input data signals received from a first direction bus that provides the input data signals to send to those processing elements of the systolic array that receive the input data signals from the first direction bus; and
skew circuitry for the clock signal to a second group of pipelined registers that process output data signals received from those processing elements of the systolic array that provide the output data signals to a second direction bus to send to the second direction bus.

20. The system of claim 19, wherein integrated circuit design tool is further configured to:
responsive to one or more requests, include a custom internal clock tree for the row or column of the processing elements in the design.

* * * * *